(12) United States Patent
Chakravarti et al.

(10) Patent No.: US 9,611,144 B2
(45) Date of Patent: Apr. 4, 2017

(54) METHOD AND SYSTEM FOR PRODUCING A SYNTHESIS GAS IN AN OXYGEN TRANSPORT MEMBRANE BASED REFORMING SYSTEM THAT IS FREE OF METAL DUSTING CORROSION

(71) Applicants: Shrikar Chakravarti, East Amherst, NY (US); Raymond Francis Drnevich, Clarence Center, NY (US); Kenneth L. Burgers, East Amherst, NY (US)

(72) Inventors: Shrikar Chakravarti, East Amherst, NY (US); Raymond Francis Drnevich, Clarence Center, NY (US); Kenneth L. Burgers, East Amherst, NY (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 144 days.

(21) Appl. No.: 14/090,289

(22) Filed: Nov. 26, 2013

(65) Prior Publication Data

US 2014/0319426 A1     Oct. 30, 2014

Related U.S. Application Data

(60) Provisional application No. 61/816,310, filed on Apr. 26, 2013.

(51) Int. Cl.
*C01B 3/26* (2006.01)
*C01B 3/38* (2006.01)
*C01B 13/02* (2006.01)

(52) U.S. Cl.
CPC .............. *C01B 3/382* (2013.01); *C01B 3/384* (2013.01); *C01B 13/0251* (2013.01);
(Continued)

(58) Field of Classification Search
CPC ....................................................... C01B 3/26
See application file for complete search history.

(56) References Cited

U.S. PATENT DOCUMENTS 2,593,507 A   4/1952   Wainer
2,692,760 A   10/1954  Flurschutz
(Continued)

FOREIGN PATENT DOCUMENTS

DE         10330859 A1    2/2004
DE    102004038435 A1    2/2006
(Continued)

OTHER PUBLICATIONS

Friedemann Marschner, et al., "Gas Production", Ullmann's Encyclopedia of Industrial Chemistry, Jun. 15, 2000, pp. 1-21, XP002253967.
(Continued)

*Primary Examiner* — Melvin C Mayes
*Assistant Examiner* — Douglas B Call
(74) *Attorney, Agent, or Firm* — Ralph J. Mancini

(57) ABSTRACT

A method and system for producing a synthesis gas in an oxygen transport membrane based reforming system that utilizes a combined feed stream having a steam to carbon ratio between about 1.6 and 3.0 and a temperature between about 500° C. and 750° C. The combined feed stream is comprised a pre-reformed hydrocarbon feed, superheated steam, and a reaction product stream created by the reaction of a hydrogen containing stream reacted with the permeated oxygen at the permeate side of the oxygen transport membrane elements and wherein the oxygen transport membrane based reforming system and associated synthesis production process equipment are substantially free of carbon formation and metal dusting corrosion.

17 Claims, 4 Drawing Sheets

(52) U.S. Cl.
CPC .......... B01J 2219/00006 (2013.01); C01B 2203/0233 (2013.01); C01B 2203/0283 (2013.01); C01B 2203/043 (2013.01); C01B 2203/0822 (2013.01); C01B 2203/0827 (2013.01); C01B 2203/142 (2013.01); Y02P 20/128 (2015.11)

(56) References Cited

U.S. PATENT DOCUMENTS

| | | | |
|---|---|---|---|
| 3,282,803 A | 11/1966 | Poepel et al. | |
| 3,317,298 A | 5/1967 | Klomp et al. | |
| 3,468,647 A | 9/1969 | Buyers et al. | |
| 3,770,621 A | 11/1973 | Collins et al. | |
| 3,861,723 A | 1/1975 | Kunz et al. | |
| 3,868,817 A | 3/1975 | Marion et al. | |
| 3,930,814 A | 1/1976 | Gessner | |
| 3,976,451 A | 8/1976 | Blackmer et al. | |
| 4,013,592 A | 3/1977 | Matsuoka et al. | |
| 4,128,776 A | 12/1978 | Bonaquist et al. | |
| 4,153,426 A | 5/1979 | Wintrell | |
| 4,162,993 A | 7/1979 | Retalick | |
| 4,175,153 A | 11/1979 | Dobo et al. | |
| 4,183,539 A | 1/1980 | French et al. | |
| 4,206,803 A | 6/1980 | Finnemore et al. | |
| 4,261,167 A | 4/1981 | Paull et al. | |
| 4,292,209 A | 9/1981 | Marchant et al. | |
| 4,350,617 A | 9/1982 | Retalick et al. | |
| 4,357,025 A | 11/1982 | Eckart | |
| 4,365,021 A | 12/1982 | Pirooz | |
| 4,373,575 A | 2/1983 | Hayes | |
| 4,402,871 A | 9/1983 | Retalick | |
| 4,609,383 A | 9/1986 | Bonaventura et al. | |
| 4,631,238 A | 12/1986 | Ruka | |
| 4,650,814 A | 3/1987 | Keller | |
| 4,651,809 A | 3/1987 | Gollnick et al. | |
| 4,720,969 A | 1/1988 | Jackman | |
| 4,734,273 A | 3/1988 | Haskell | |
| 4,749,632 A | 6/1988 | Flandermeyer et al. | |
| 4,783,085 A | 11/1988 | Wicks et al. | |
| 4,791,079 A | 12/1988 | Hazbun | |
| 4,862,949 A | 9/1989 | Bell, III | |
| 4,866,013 A | 9/1989 | Anseau et al. | |
| 5,021,137 A | 6/1991 | Joshi et al. | |
| 5,035,726 A | 7/1991 | Chen et al. | |
| 5,061,297 A | 10/1991 | Krasberg | |
| 5,143,751 A | 9/1992 | Richard et al. | |
| 5,169,506 A | 12/1992 | Michaels | |
| 5,169,811 A | 12/1992 | Cipollini et al. | |
| 5,171,646 A | 12/1992 | Rohr | |
| 5,185,301 A | 2/1993 | Li et al. | |
| 5,205,990 A | 4/1993 | Lawless | |
| 5,240,480 A | 8/1993 | Thorogood et al. | |
| 5,259,444 A | 11/1993 | Wilson | |
| 5,286,686 A | 2/1994 | Haig et al. | |
| 5,298,469 A | 3/1994 | Haig et al. | |
| 5,302,258 A | 4/1994 | Renlund et al. | |
| 5,306,411 A | 4/1994 | Mazanec et al. | |
| 5,342,705 A | 8/1994 | Minh et al. | |
| 5,356,730 A | 10/1994 | Minh et al. | |
| 5,417,101 A | 5/1995 | Weich | |
| 5,432,705 A | 7/1995 | Severt et al. | |
| 5,454,923 A | 10/1995 | Nachlas et al. | |
| 5,478,444 A | 12/1995 | Liu et al. | |
| 5,534,471 A | 7/1996 | Carolan et al. | |
| 5,547,494 A | 8/1996 | Prasad et al. | |
| 5,569,633 A | 10/1996 | Carolan et al. | |
| 5,599,509 A | 2/1997 | Toyao et al. | |
| 5,643,355 A | 7/1997 | Phillips et al. | |
| 5,649,517 A | 7/1997 | Poola et al. | |
| 5,707,911 A | 1/1998 | Rakhimov et al. | |
| 5,750,279 A | 5/1998 | Carolan et al. | |
| 5,804,155 A | 9/1998 | Farrauto et al. | |
| 5,820,654 A | 10/1998 | Gottzman et al. | |
| 5,820,655 A | 10/1998 | Gottzmann et al. | |
| 5,837,125 A | 11/1998 | Prasad et al. | |
| 5,855,762 A | 1/1999 | Phillips et al. | |
| 5,864,576 A | 1/1999 | Nakatani et al. | |
| 5,902,379 A | 5/1999 | Phillips et al. | |
| 5,927,103 A | 7/1999 | Howard | |
| 5,932,141 A | 8/1999 | Rostrop-Nielsen et al. | |
| 5,944,874 A | 8/1999 | Prasad et al. | |
| 5,964,922 A | 10/1999 | Keskar et al. | |
| 5,975,130 A | 11/1999 | Ligh et al. | |
| 5,980,840 A | 11/1999 | Kleefisch et al. | |
| 6,010,614 A | 1/2000 | Keskar et al. | |
| 6,035,662 A | 3/2000 | Howard et al. | |
| 6,048,472 A | 4/2000 | Nataraj et al. | |
| 6,051,125 A | 4/2000 | Pham et al. | |
| 6,070,471 A | 6/2000 | Westphal et al. | |
| 6,077,323 A * | 6/2000 | Nataraj et al. | 48/198.1 |
| 6,110,979 A | 8/2000 | Nataraj et al. | |
| 6,113,673 A | 9/2000 | Loutfy et al. | |
| 6,114,400 A | 9/2000 | Nataraj et al. | |
| 6,139,810 A | 10/2000 | Gottzmann et al. | |
| 6,153,163 A | 11/2000 | Prasad et al. | |
| RE37,134 E | 4/2001 | Wilson | |
| 6,214,066 B1 | 4/2001 | Nataraj et al. | |
| 6,214,314 B1 | 4/2001 | Abbott | |
| 6,290,757 B1 | 9/2001 | Lawless | |
| 6,293,084 B1 | 9/2001 | Drnevich et al. | |
| 6,293,978 B2 | 9/2001 | Kleefisch et al. | |
| 6,296,686 B1 | 10/2001 | Prasad et al. | |
| 6,333,015 B1 | 12/2001 | Lewis | |
| 6,352,624 B1 | 3/2002 | Crome et al. | |
| 6,355,093 B1 | 3/2002 | Schwartz et al. | |
| 6,360,524 B1 | 3/2002 | Drnevich et al. | |
| 6,368,491 B1 | 4/2002 | Cao et al. | |
| 6,382,958 B1 | 5/2002 | Bool, III et al. | |
| 6,394,043 B1 | 5/2002 | Bool, III et al. | |
| 6,402,156 B1 | 6/2002 | Schutz et al. | |
| 6,402,988 B1 | 6/2002 | Gottzmann et al. | |
| 6,430,966 B1 | 8/2002 | Meinhardt et al. | |
| 6,468,328 B2 | 10/2002 | Sircar et al. | |
| 6,475,657 B1 | 11/2002 | Del-Gallo et al. | |
| 6,492,290 B1 | 12/2002 | Dyer et al. | |
| 6,532,769 B1 | 3/2003 | Meinhardt et al. | |
| 6,537,514 B1 | 3/2003 | Prasad et al. | |
| 6,562,104 B2 | 5/2003 | Bool, III et al. | |
| 6,592,731 B1 | 7/2003 | Lawless | |
| 6,638,575 B1 | 10/2003 | Chen et al. | |
| 6,641,626 B2 | 11/2003 | Van Calcar et al. | |
| 6,652,626 B1 | 11/2003 | Plee | |
| 6,681,589 B2 | 1/2004 | Brudnicki | |
| 6,695,983 B2 | 2/2004 | Prasad et al. | |
| 6,783,750 B2 | 8/2004 | Shah et al. | |
| 6,786,952 B1 | 9/2004 | Risdal et al. | |
| 6,811,904 B2 | 11/2004 | Gorte et al. | |
| 6,846,511 B2 | 1/2005 | Visco et al. | |
| 6,916,570 B2 | 7/2005 | Vaughey et al. | |
| 7,077,133 B2 | 7/2006 | Yagi et al. | |
| 7,125,528 B2 | 10/2006 | Besecker et al. | |
| 7,153,559 B2 | 12/2006 | Ito et al. | |
| 7,179,323 B2 | 2/2007 | Stein et al. | |
| 7,229,537 B2 | 6/2007 | Chen et al. | |
| 7,261,751 B2 | 8/2007 | Dutta et al. | |
| 7,320,778 B2 | 1/2008 | Whittenberger | |
| 7,351,488 B2 | 4/2008 | Visco et al. | |
| 7,374,601 B2 | 5/2008 | Bonchonsky et al. | |
| 7,396,442 B2 | 7/2008 | Bagby et al. | |
| 7,427,368 B2 | 9/2008 | Drnevich | |
| 7,470,811 B2 | 12/2008 | Thiebaut | |
| 7,510,594 B2 | 3/2009 | Wynn et al. | |
| 7,534,519 B2 | 5/2009 | Cable et al. | |
| 7,556,676 B2 | 7/2009 | Nagabhushana et al. | |
| 7,588,626 B2 | 9/2009 | Gopalan et al. | |
| 7,658,788 B2 | 2/2010 | Holmes et al. | |
| 7,786,180 B2 | 8/2010 | Fitzpatrick | |
| 7,833,314 B2 | 11/2010 | Lane et al. | |
| 7,846,236 B2 | 12/2010 | Del-Gallo et al. | |
| 7,856,829 B2 | 12/2010 | Shah et al. | |
| 7,871,579 B2 | 1/2011 | Tentarelli | |
| 7,901,837 B2 | 3/2011 | Jacobson et al. | |
| 7,906,079 B2 | 3/2011 | Whittenberger et al. | |
| 7,968,208 B2 | 6/2011 | Hodgson | |

(56) References Cited

U.S. PATENT DOCUMENTS

| | | |
|---|---|---|
| 8,070,922 B2 | 12/2011 | Nelson et al. |
| 8,128,988 B2 | 3/2012 | Yasumoto et al. |
| 8,196,387 B2 | 6/2012 | Shah et al. |
| 8,201,852 B2 | 6/2012 | Linhorst et al. |
| 8,262,755 B2 | 9/2012 | Repasky et al. |
| 8,323,378 B2 | 12/2012 | Swami et al. |
| 8,323,463 B2 | 12/2012 | Christie et al. |
| 8,349,214 B1* | 1/2013 | Kelly .................. C01B 3/384 252/373 |
| 8,419,827 B2 | 4/2013 | Repasky et al. |
| 8,435,332 B2 | 5/2013 | Christie et al. |
| 8,455,382 B2 | 6/2013 | Carolan et al. |
| 8,658,328 B2 | 2/2014 | Suda et al. |
| 8,795,417 B2 | 8/2014 | Christie et al. |
| 8,894,944 B2 | 11/2014 | Larsen et al. |
| 9,023,245 B2 | 5/2015 | Chakravarti et al. |
| 9,115,045 B2 | 8/2015 | Chakravarti et al. |
| 9,212,113 B2 | 12/2015 | Chakravarti et al. |
| 9,296,671 B2 | 3/2016 | Stuckert et al. |
| 9,365,466 B2 | 6/2016 | Chakravarti et al. |
| 9,452,401 B2 | 9/2016 | Kelly et al. |
| 9,453,644 B2 | 9/2016 | Kromer et al. |
| 2002/0073938 A1 | 6/2002 | Bool et al. |
| 2002/0078906 A1 | 6/2002 | Prasad et al. |
| 2002/0141920 A1 | 10/2002 | Alvin et al. |
| 2002/0155061 A1 | 10/2002 | Prasad et al. |
| 2003/0039601 A1* | 2/2003 | Halvorson et al. .......... 422/198 |
| 2003/0039608 A1 | 2/2003 | Shah et al. |
| 2003/0054154 A1 | 3/2003 | Chen et al. |
| 2003/0068260 A1 | 4/2003 | Wellington |
| 2003/0230196 A1 | 12/2003 | Kim |
| 2004/0042944 A1 | 3/2004 | Sehlin et al. |
| 2004/0043272 A1 | 3/2004 | Gorte |
| 2004/0065541 A1 | 4/2004 | Sehlin |
| 2004/0089973 A1 | 5/2004 | Hoang |
| 2004/0221722 A1 | 11/2004 | Prasad et al. |
| 2005/0037299 A1 | 2/2005 | Gottzmann |
| 2005/0058871 A1 | 3/2005 | Li et al. |
| 2005/0061663 A1 | 3/2005 | Chen et al. |
| 2005/0137810 A1 | 6/2005 | Esposito, Jr. |
| 2005/0214612 A1 | 9/2005 | Visco et al. |
| 2005/0248098 A1 | 11/2005 | Sisk et al. |
| 2005/0263405 A1 | 12/2005 | Jacobson et al. |
| 2006/0029539 A1 | 2/2006 | Dutta et al. |
| 2006/0054301 A1 | 3/2006 | McRay et al. |
| 2006/0062707 A1 | 3/2006 | Crome et al. |
| 2006/0127656 A1 | 6/2006 | Gallo et al. |
| 2006/0127749 A1 | 6/2006 | Christie et al. |
| 2006/0191408 A1 | 8/2006 | Gopalan et al. |
| 2006/0236719 A1 | 10/2006 | Lane et al. |
| 2007/0004809 A1 | 1/2007 | Lattner et al. |
| 2007/0029342 A1 | 2/2007 | Cross et al. |
| 2007/0039466 A1 | 2/2007 | Nawata et al. |
| 2007/0041894 A1 | 2/2007 | Drnevich |
| 2007/0065687 A1 | 3/2007 | Kelly et al. |
| 2007/0082254 A1 | 4/2007 | Hiwatashi |
| 2007/0104793 A1 | 5/2007 | Akash |
| 2007/0122667 A1 | 5/2007 | Kelley |
| 2007/0137478 A1 | 6/2007 | Stein et al. |
| 2007/0158329 A1 | 7/2007 | Cao |
| 2007/0163889 A1 | 7/2007 | Kato et al. |
| 2007/0212271 A1 | 9/2007 | Kennedy et al. |
| 2007/0289215 A1 | 12/2007 | Hemmings et al. |
| 2007/0292342 A1 | 12/2007 | Hemmings et al. |
| 2008/0000350 A1 | 1/2008 | Mundschau et al. |
| 2008/0000353 A1 | 1/2008 | Rarig et al. |
| 2008/0006532 A1 | 1/2008 | Mukundan et al. |
| 2008/0023338 A1 | 1/2008 | Stoots et al. |
| 2008/0029388 A1 | 2/2008 | Elangovan et al. |
| 2008/0047431 A1 | 2/2008 | Nagabhushana |
| 2008/0141672 A1 | 6/2008 | Shah et al. |
| 2008/0168901 A1 | 7/2008 | Carolan et al. |
| 2008/0169449 A1 | 7/2008 | Mundschau |
| 2008/0226544 A1 | 9/2008 | Nakamura |
| 2008/0302013 A1 | 12/2008 | Repasky et al. |
| 2009/0001727 A1 | 1/2009 | De Koeijer et al. |
| 2009/0018373 A1 | 1/2009 | Werth et al. |
| 2009/0023050 A1 | 1/2009 | Finnerty et al. |
| 2009/0029040 A1 | 1/2009 | Christie et al. |
| 2009/0031895 A1 | 2/2009 | Del-Gallo et al. |
| 2009/0084035 A1 | 4/2009 | Wei |
| 2009/0107046 A1 | 4/2009 | Leininger |
| 2009/0120379 A1 | 5/2009 | Bozzuto et al. |
| 2009/0220837 A1 | 9/2009 | Osada |
| 2009/0272266 A1 | 11/2009 | Werth et al. |
| 2010/0015014 A1 | 1/2010 | Gopalan et al. |
| 2010/0074828 A1 | 3/2010 | Singh |
| 2010/0076280 A1 | 3/2010 | Bernstein et al. |
| 2010/0116133 A1 | 5/2010 | Reed et al. |
| 2010/0116680 A1 | 5/2010 | Reed et al. |
| 2010/0122552 A1 | 5/2010 | Schwartz |
| 2010/0143824 A1 | 6/2010 | Tucker et al. |
| 2010/0178219 A1 | 7/2010 | Verykios et al. |
| 2010/0178238 A1 | 7/2010 | Takamura et al. |
| 2010/0193104 A1 | 8/2010 | Ryu et al. |
| 2010/0200418 A1 | 8/2010 | Licht |
| 2010/0266466 A1 | 10/2010 | Froehlich et al. |
| 2010/0276119 A1* | 11/2010 | Doty .................. 165/104.31 |
| 2010/0313762 A1 | 12/2010 | Roeck et al. |
| 2011/0020192 A1 | 1/2011 | Baumann et al. |
| 2011/0067405 A1 | 3/2011 | Armstrong et al. |
| 2011/0076213 A1 | 3/2011 | Carolan et al. |
| 2011/0111320 A1 | 5/2011 | Suda et al. |
| 2011/0120127 A1 | 5/2011 | Lippmann et al. |
| 2011/0132367 A1 | 6/2011 | Patel |
| 2011/0142722 A1 | 6/2011 | Hemmings et al. |
| 2011/0143255 A1 | 6/2011 | Jain et al. |
| 2011/0180399 A1 | 7/2011 | Christie et al. |
| 2011/0200520 A1 | 8/2011 | Ramkumar |
| 2011/0240924 A1 | 10/2011 | Repasky |
| 2011/0253551 A1 | 10/2011 | Lane et al. |
| 2012/0000360 A1 | 1/2012 | Richet et al. |
| 2012/0067060 A1 | 3/2012 | Greeff |
| 2012/0288439 A1* | 11/2012 | Sundaram .................. C01B 3/32 423/652 |
| 2012/0294783 A1* | 11/2012 | Palamara .................. C01B 3/384 422/625 |
| 2013/0009100 A1 | 1/2013 | Kelly et al. |
| 2013/0009102 A1* | 1/2013 | Kelly et al. .................. 252/373 |
| 2013/0015405 A1 | 1/2013 | Quintero |
| 2013/0072374 A1 | 3/2013 | Lane et al. |
| 2013/0072375 A1 | 3/2013 | Lane et al. |
| 2013/0156958 A1 | 6/2013 | Belov et al. |
| 2014/0044604 A1 | 2/2014 | Lane et al. |
| 2014/0056774 A1 | 2/2014 | Kelly et al. |
| 2014/0060643 A1 | 3/2014 | Martin et al. |
| 2014/0183866 A1 | 7/2014 | Kromer et al. |
| 2014/0206779 A1 | 7/2014 | Lackner |
| 2014/0319424 A1 | 10/2014 | Chakravarti et al. |
| 2014/0319427 A1 | 10/2014 | Chakravarti et al. |
| 2014/0323597 A1 | 10/2014 | Stuckert et al. |
| 2014/0323598 A1 | 10/2014 | Chakravarti et al. |
| 2014/0323599 A1 | 10/2014 | Chakravarti et al. |
| 2015/0098872 A1 | 4/2015 | Kelly et al. |
| 2015/0132485 A1 | 5/2015 | Garing et al. |
| 2015/0226118 A1 | 8/2015 | Kelly et al. |

FOREIGN PATENT DOCUMENTS

| | | |
|---|---|---|
| EP | 0 663 231 A2 | 7/1995 |
| EP | 0 926 096 A1 | 6/1999 |
| EP | 0 984 500 A2 | 3/2000 |
| EP | 0 989 093 A2 | 3/2000 |
| EP | 1 504 811 A1 | 2/2005 |
| EP | 1717420 A1 | 11/2006 |
| EP | 1743694 A1 | 1/2007 |
| EP | 2873451 A1 | 5/2015 |
| GB | 688657 | 3/1953 |
| GB | 689522 | 4/1953 |
| GB | 697377 | 9/1953 |
| GB | 713553 | 11/1954 |
| GB | 1199483 | 7/1970 |
| GB | 1 312 700 | 4/1973 |
| GB | 1348375 | 3/1974 |

(56) References Cited

FOREIGN PATENT DOCUMENTS

| JP | 56-136605 | 10/1981 |
|---|---|---|
| WO | WO 97/41060 | 11/1997 |
| WO | WO 2011/020192 A1 | 11/1997 |
| WO | WO 9842636 | 10/1998 |
| WO | WO 0017418 | 3/2000 |
| WO | WO 0109059 A1 | 2/2001 |
| WO | WO 2007060141 | 5/2007 |
| WO | WO 2007/092844 A2 | 8/2007 |
| WO | WO 2007086949 | 8/2007 |
| WO | WO 2008024405 | 2/2008 |
| WO | WO 2009/027099 A1 | 3/2009 |
| WO | WO 2010052641 A2 | 5/2010 |
| WO | WO 2011083333 A1 | 7/2011 |
| WO | WO 2011121095 A2 | 10/2011 |
| WO | WO 2012118730 | 9/2012 |
| WO | WO 2013009560 A1 | 1/2013 |
| WO | WO 2013/062413 A1 | 5/2013 |
| WO | WO 2013089895 A1 | 6/2013 |
| WO | WO 2014074559 A1 | 5/2014 |
| WO | WO 2014077531 A1 | 5/2014 |
| WO | WO 2014/107707 A2 | 7/2014 |
| WO | WO 2014176022 A1 | 10/2014 |

OTHER PUBLICATIONS

Switzer et al., "Cost and Feasibility Study on the Praxair Advanced Boiler for the CO2 Capture Project's Refinery Scenario", Carbon Dioxide Capture for Deep Geologic Formations, vol. 1, D.C. Thomas and S.M. Benson (Eds.), Copyright 2005 Published by Elsevier Ltd., Chapter 32, pp. 561-579.
David Studer; Demonstration of a cylinder fill system based on solid electrolyte oxygen separator (SEOS) technology: Early field assessment at a USAF maintenance facility, (Air Products & Chemicals Inc.); AFRL-RH-BR-TR-2010-0046; Jun. 2010.
Zhu et al.; Development of Interconnect Materials for Solid Oxide Fuel Cells; Materials Science and Engineering A348, Apr. 23, 2002, pp. 227-243.
Lee Rosen et al.; "Development of Oxygen Transport Membranes for Coal-Based Power Generation"; ScienceDirect (Available online at www.sciencedirect.com); Energy Procedia 4 (2011) pp. 750-755.
F. Bidrawn et al., "Efficient Reduction of CO2 in a Solid Oxide Electrolyzer" Electrochemical and Solid State Letters, vol. 11, No. 9, Jun. 20, 2008, pp. B167-B170, XP002644615, col. 1, 2.
Ebbesen et al., "Electrolysis of carbon dioxide in Solid Oxide Electrolysis Cells", Journal of Power Sources, Elsevier SA, CH, vol. 193, No. 1, Aug. 1, 2009, pp. 349-358, XP026150424, ISSN: 0378-7753, DOI: 10.1016/J. JPOWSOUR. 2009. 02. 093.
The U.S. Department of Energy, "Evaluation of Fossil Fuel Power Plants with CO2 Recovery", Final Report (Feb. 2002).
The U.S. Department of Energy—Office of Fossil energy and U.S. Department of Energy/NETL, "Evaluation of Innovative Fossil Fuel Power Plants with CO2 Removal", Interim Report (Dec. 2000).
Sylvain Deville; "Freeze-Casting of Porous Ceramics: A Review of Current Achievements and Issues"; Advanced Engineering Materials 2008, 10, No. 3, pp. 155-169.
Neville Holt, "Gasification Process Selection—Trade-offs and Ironies", Presented at the Gasification Technologies Conference 2004, Oct. 3-6, 2004 JW Marriott Hotel, Washington, DC, pp. 1-10.
Dyer et al., "Ion Transport Membrane Technology for Oxygen Separation and Syngas Production", Solid State Ionics 134 (2000) p. 21-33.
Andrea Montebelli et al., "Methods for the catalytic activation of metallic structured substrates", Catalysis Science & Technology, 2014, pp. 2846-2870.
Joseph J. Beaman, D.Sc.; "Oxygen Storage on Zeolites"; Prepared by USAF School of Aerospace Medicine, Human systems Divisions (AFSC), Brooks Air Force Base, TX 78235-5301; USAFSAM-TR-88-26; AD-A209 352; pp. 1-77; Jan. 1989.
Radtke et al., "Renaissance of Gasification based on Cutting Edge Technologies", VGB PowerTech (2005), XP-001235150, pp. 106-115.
L. N. Protasova et al., "Review of Patent Publications from 1990 to 2010 on Catytic Coatings on Different Substrates, Including Microstructured Channels: Preparation, Deposition Techniques, Applications", Recent Patents on Chemical Engineering, 2012, pp. 28-44.
Zhimin Zhong, "Stoichiometric lanthanum chromite based ceramic interconnects with low sintering temperature", Solid State of Ionics, North Holland Pub. Company, Amsterdam, NL, vol. 177 No. 7-8, Mar. 15, 2006, pp. 757-764, XP027895768,ISSN: 0167-2738.
Babcock & Wilcox, Steam 40, "Sulfur Dioxide Control" (1992), pp. 35-1—35-15.
M.F. Lu et al., Thermomechanical transport and anodic properties of perovskite-type (LaSr) CrFeO, Journal of Power Sources, Elsevier SA, CH, vol. 206, Jan. 15, 2012, pp. 59-69, XP028403091.
Okawa et al., Trial Design of a CO2 Recovery Power Plant by Burning Pulverized Coal in O2/CO2, Energy Convers. Mgmt., vol. 38, Supplement (1997) pp. S123- S127.
Ciacchi et al., "Tubular zirconia-yttria electrolyte membrane technology for oxygen separation", Solid State Ionics 152-153, 2002, pp. 763-768

* cited by examiner

METHOD AND SYSTEM FOR PRODUCING A SYNTHESIS GAS IN AN OXYGEN TRANSPORT MEMBRANE BASED REFORMING SYSTEM THAT IS FREE OF METAL DUSTING CORROSION

CROSS REFERENCE TO RELATED APPLICATIONS

This application claims priority to and the benefit of U.S. provisional patent application Ser. No. 61/816,310 filed on Apr. 26, 2013, the disclosure of which is incorporated by reference herein.

FIELD OF THE INVENTION

The present invention relates to a method and system for producing a synthesis gas in an oxygen transport membrane based reforming system, and more particularly, a method and system for producing a synthesis gas in an oxygen transport membrane based reforming system that utilizes a combined feed stream comprised a pre-reformed hydrocarbon feed, superheated steam, and a reaction product stream created by the reaction of a hydrogen containing stream reacted with the permeated oxygen at the permeate side of oxygen transport membrane elements, wherein the oxygen transport membrane based reforming system and associated synthesis production process equipment are substantially free of carbon formation and metal dusting corrosion.

BACKGROUND

Synthesis gas containing hydrogen and carbon monoxide is used for a variety of industrial applications, for example, the production of hydrogen, chemicals and synthetic fuel production. Conventionally, the synthesis gas is produced in a fired reformer in which natural gas and steam is reformed in nickel catalyst containing reformer tubes at high temperatures (e.g., 850° C. to 1000° C.) and moderate pressures (e.g., 16 to 30 bar) to produce the synthesis gas. The endothermic heating requirements for steam methane reforming reactions occurring within the reformer tubes are provided by burners firing into the furnace that are fueled by part of the natural gas. In order to increase the hydrogen content of the synthesis gas produced by the steam methane reforming (SMR) process, the synthesis gas can be subjected to water-gas shift reactions to react residual steam in the synthesis gas with the carbon monoxide.

A well established alternative to steam methane reforming is the non-catalytic partial oxidation process (POx) whereby a substoichiometric amount of oxygen is allowed to react with the natural gas feed creating steam and carbon dioxide at high temperatures. The high temperature residual methane is reformed through reactions with the high temperature steam and carbon dioxide.

An attractive alternative process for producing synthesis gas is the autothermal reformer (ATR) process which uses oxidation to produce heat with a catalyst to permit reforming to occur at lower temperatures than the POx process. Similar to the POx process, oxygen is required to partially oxidize natural gas in a burner to provide heat, high temperature carbon dioxide and steam to reform the residual methane. Normally some steam needs to be added to the natural gas to control carbon formation on the catalyst. However, both the ATR as well as POx processes require separate air separation units (ASU) to produce high-pressure oxygen, which adds complexity as well as capital and operating cost to the overall process.

When the feedstock contains significant amounts of heavy hydrocarbons, SMR and ATR processes, are typically preceded by a pre-reforming step. Pre-reforming is a catalyst based process for converting higher hydrocarbons to methane, hydrogen, carbon monoxide and carbon dioxide. The reactions involved in pre-reforming are endothermic. Most pre-reformers operate adiabatically, and thus the pre-reformed feedstock leaves at a much lower temperature than the feedstock entering the pre-reformer. Another process that will be discussed in this invention is the secondary reforming process, which is essentially an autothermal process that is fed the product from a steam methane reforming process. Thus, the feed to a secondary reforming process is primarily synthesis gas from steam methane reforming. Depending on the end application, some natural gas may bypass the SMR process and be directly introduced into the secondary reforming step. Also, when a SMR process is followed by a secondary reforming process, the SMR may operate at a lower temperature, e.g. 650° C. to 825° C. versus 850° C. to 1000° C.

As can be appreciated, the conventional methods of producing a synthesis gas such as have been discussed above are expensive and require complex installations. To overcome the complexity and expense of such installations it has been proposed to generate the synthesis gas within reactors that utilize an oxygen transport membrane to supply oxygen and thereby generate the heat necessary to support endothermic heating requirements of the steam methane reforming reactions. A typical oxygen transport membrane has a dense layer that, while being impervious to air or other oxygen containing gas, will transport oxygen ions when subjected to an elevated operational temperature and a difference in oxygen partial pressure across the membrane.

Examples of oxygen transport membrane based reforming systems used in the production of synthesis gas can be found in U.S. Pat. Nos. 6,048,472; 6,110,979; 6,114,400; 6,296,686; 7,261,751; 8,262,755; and 8,419,827. The problem with all of these oxygen transport membrane based systems is that because such oxygen transport membranes need to operate at high temperatures of around 900° C. to 1100° C., preheating of the hydrocarbon feed to similarly high temperatures is often required. Where hydrocarbons such as methane and higher order hydrocarbons are subjected to such high temperatures, excessive carbon formation will occur in the feed stream, especially at high pressures and low steam to carbon ratios. The carbon formation problems are particularly severe in the above-identified prior art oxygen transport membrane based systems. A different approach to using an oxygen transport membrane based reforming system in the production of synthesis gas is disclosed in U.S. Pat. No. 8,349,214 which provides a reactively driven oxygen transport membrane based reforming system that uses hydrogen and carbon monoxide as part of the reactant gas feed which address many of the highlighted problems with the earlier oxygen transport membrane systems.

Other problems that arise with the prior art oxygen transport membrane based reforming systems are the cost of the oxygen transport membrane modules and the lower than desired durability, reliability and operating availability of such oxygen transport membrane based reforming systems. These problems are the primary reasons that oxygen transport membranes based reforming systems have not been successfully commercialized. Advances in oxygen transport membrane materials have addressed problems associated with oxygen flux, membrane degradation and creep life, but there is much work left to be done to achieve commercially viable oxygen transport membrane based reforming systems from a cost standpoint as well as from an operating reliability and availability standpoint.

The present invention addresses the aforementioned problems by providing an improved process for making synthesis gas using a reactively-driven oxygen transport membrane based reforming system that comprises an oxidation process occurring at the permeate side of the oxygen transport membranes and a reforming process facilitated by a reformer catalyst in close proximity to the reactively-driven oxygen transport membranes. The oxidation process, which is exothermic, and the reforming process, which is endothermic, both occur within the oxygen transport membrane based reforming system and thus have a high degree of thermal integration so that heat released in the oxidation process supplies the heat absorbed by the reforming process.

Specifically, the improvements to the reactively-driven oxygen transport membrane based reforming system include modifications to the steam and hydrocarbon feed stream to increase steam to carbon ratio thereby reducing methane slip, mitigating carbon formation issues within the system and reducing the hydrocarbon feed requirements to the reformers. It has been found that conditioning the steam and hydrocarbon feed stream feed stream to a particular temperature range and steam to carbon ratio translates into an optimum operating regime with noticeably less reliability problems in the oxygen transport membrane based reforming system due to carbon formation. In addition, using a reactively driven oxygen transport membrane system with hydrogen and carbon-monoxide as a portion of the reactant gas mixture produces a higher oxygen flux compared to reactively-driven oxygen transport membranes that use only steam-methane feed as the reactant gas mixture mixtures which produce a lower flux. The actual difference in flux performance is a function of pressure, temperature, and reactant gas concentrations.

Additional improvements to the reactively-driven oxygen transport membrane based reactor and system include modifications to the heat recovery train and synthesis gas recycle loop to mitigate metal dusting and carbon formation issues that adversely impact system performance, reliability and durability. In addition, modifications or changes to the synthesis gas recycle loop allows for use of higher temperature synthesis gas in the recycle loop which decreases the oxygen requirement compared to previous reactively-driven oxygen transport membrane based reformer reactor designs.

SUMMARY OF THE INVENTION

The present invention may be characterized as a method for producing synthesis gas in an oxygen transport membrane based reforming system, which comprises two reactors, including a reforming catalyst containing reformer reactor and an oxidation catalyst containing oxygen transport membrane reactor preferably in the form of tubes, the method comprising the steps of: (i) separating an oxygen containing stream into an oxygen permeate and an oxygen depleted retentate stream using a plurality of oxygen transport membrane elements disposed in the oxygen transport membrane based reforming system; (ii) reacting a hydrogen containing stream contacting a permeate side of the oxygen transport membrane elements with the oxygen permeate to generate a reaction product stream and heat; (iii) pre-heating a hydrocarbon containing feed stream and combining the pre-heated hydrocarbon containing feed stream with a portion of the reaction product stream and steam to produce a combined feed stream having a temperature between about 500° C. and 750° C.; (iv) reforming the combined feed steam in the at least one catalyst containing reforming reactor in the presence of the catalyst and the heat generated by the reaction of the hydrogen containing stream and permeated oxygen to produce a synthesis gas stream, the at least one catalyst based reforming reactor disposed proximate the oxygen transport membrane elements; (v) cooling the synthesis gas stream exiting the oxygen transport membrane based reforming system to a temperature of less than about 400° C. via indirect heat exchange with a boiler feed water stream and wherein the steam is produced from the indirect heat exchange between the synthesis gas stream and the boiler feed water stream; and (vi) feeding a portion of the cooled synthesis gas stream to the permeate side of the plurality of oxygen transport membrane elements to form all or a portion of the hydrogen containing stream, wherein the oxygen transport membrane based reforming system and associated synthesis production process equipment are substantially free of carbon formation and metal dusting corrosion.

Additional steps that may be incorporated in the present method include superheating the steam by heating the steam via indirect heat exchange with the oxygen depleted retentate stream, preferably at a pressure between about 15 bar to 80 bar and to a temperature between about 300° C. and 600° C.; and directing a portion of the superheated steam to the hydrocarbon containing feed stream to adjust the steam to carbon ratio and temperature of the combined feed stream.

In some embodiments, the present method includes the steps of further cooling the synthesis gas stream with one or more of the following streams: a boiler feed water stream in an economizer to produce heated boiler feed water; a feed water stream in a feed water heater to heat the feed water; or a cooling water stream in a cooling water heat exchanger. In addition, a portion of the cooled synthesis gas stream may be recycled or directed to the permeate side of the oxygen transport membrane elements to react with the oxygen permeate. In this manner, the recycled portion of the cooled synthesis gas forms at least a part of the hydrogen containing stream. The recycled portion of the cooled synthesis gas may also be compressed and preheated against steam or any other stream, provided the wall temperature is maintained at less than about 400° C. when directed to the permeate side of the oxygen transport membrane elements.

The step of pre-heating the hydrocarbon feed stream further may comprises pre-heating the hydrocarbon containing feed stream via indirect heat exchange with the synthesis gas stream or via indirect heat exchange with the oxygen depleted retentate stream or both. Likewise, the step of combining the pre-heated hydrocarbon containing feed stream with a portion of the reaction product stream and steam to produce the combined feed stream further may comprises first mixing the hydrocarbon feed stream with superheated steam and heating this mixed stream via indirect heat exchange with the oxygen depleted retentate stream.

The present invention may also be characterized as an oxygen transport membrane based reforming system for producing synthesis gas that is substantially free of carbon formation and metal dusting corrosion. The oxygen transport membrane based reforming system comprises: (a) a reactor housing; (b) at least one catalyst containing reforming reactor disposed in the reactor housing and configured to produce a synthesis gas stream by reacting a combined feed stream in the presence of the catalyst and heat; (c) a reactively driven oxygen transport membrane reactor disposed in the reactor housing proximate the at least one catalyst containing reforming reactor, the reactively driven oxygen transport membrane reactor comprising a plurality of oxygen transport membrane elements configured to separate oxygen from an oxygen containing feed stream and produce an oxygen permeate at a permeate side of the oxygen transport membrane elements and an oxygen depleted retentate stream at a retentate side of the oxygen transport membrane elements; (d) a hydrogen containing stream in contact with the permeate side of the plurality of oxygen transport membrane elements, wherein the permeated oxygen reacts with the hydrogen containing stream to reactively drive the separation of oxygen from the oxygen containing feed stream and to generate a reaction product stream and heat that is transferred to the oxygen depleted retentate stream and to at least one catalyst containing reforming reactor; and (e) a heat exchange network fluidically coupled to the reforming reactor and the oxygen transport membrane reactor and configured to: (i) cool the synthesis gas stream exiting the at least one catalyst containing reforming reactor to a temperature of less than about 400° C.; (ii) produce steam, and (iii) pre-heat a hydrocarbon containing feed stream. In many embodiments, the pre-heated hydrocarbon feed and steam are mixed with the reaction product stream upstream of the at least one catalyst containing reforming reactor to produce the combined feed stream having a temperature wherein the combined feed stream has a steam to carbon ratio between about 1.6 and 3.0 and a temperature between about 500° C. and 750° C.

The present system may further include a synthesis gas recycle circuit between the heat exchange network and the oxygen transport membrane reactor to recirculate a portion of the cooled synthesis gas to the permeate side of the oxygen transport membrane elements to form all or a portion of the hydrogen containing stream. Since the recycled synthesis gas is maintained at a temperature of less than about 400° C., the present oxygen transport membrane based reforming system and associated synthesis production process equipment will be substantially free of carbon formation and metal dusting corrosion.

The heat exchange network preferably comprises a first heat exchanger configured to cool the synthesis gas stream via indirect heat exchange with a process gas boiler feed stream and wherein the steam is produce from the indirect heat exchange between the synthesis gas stream and the process gas boiler feed water stream and a second heat exchanger configured to pre-heat the hydrocarbon containing feed stream via indirect heat exchange with the cooled synthesis gas stream.

Optionally, the heat exchange network further comprises one or more coils disposed in an oxygen depleted retentate stream duct and wherein the steam is superheated to a pressure of between about 15 bar to 80 bar and a temperature of between about 300° C. and 600° C. via indirect heat exchange with the oxygen depleted retentate stream as the steam is directed through the one or more coils disposed in the oxygen depleted retentate stream duct. In some embodiments, the hydrocarbon containing feed stream or a combination of the hydrocarbon feed stream and steam are also pre-heated via indirect heat exchange with the oxygen depleted retentate stream as the stream is directed through the one or more coils disposed in the oxygen depleted retentate stream duct.

BRIEF DESCRIPTION OF THE DRAWINGS

While the specification concludes with claims distinctly pointing out the subject matter that applicants regard as their invention, it is believed that the invention will be better understood when taken in connection with the accompanying drawings in which:

For the sake of avoiding repetition, some of the common elements in the various Figures utilize the same numbers where the explanation of such elements would not change from Figure to Figure.

DETAILED DESCRIPTION

Figure 1:
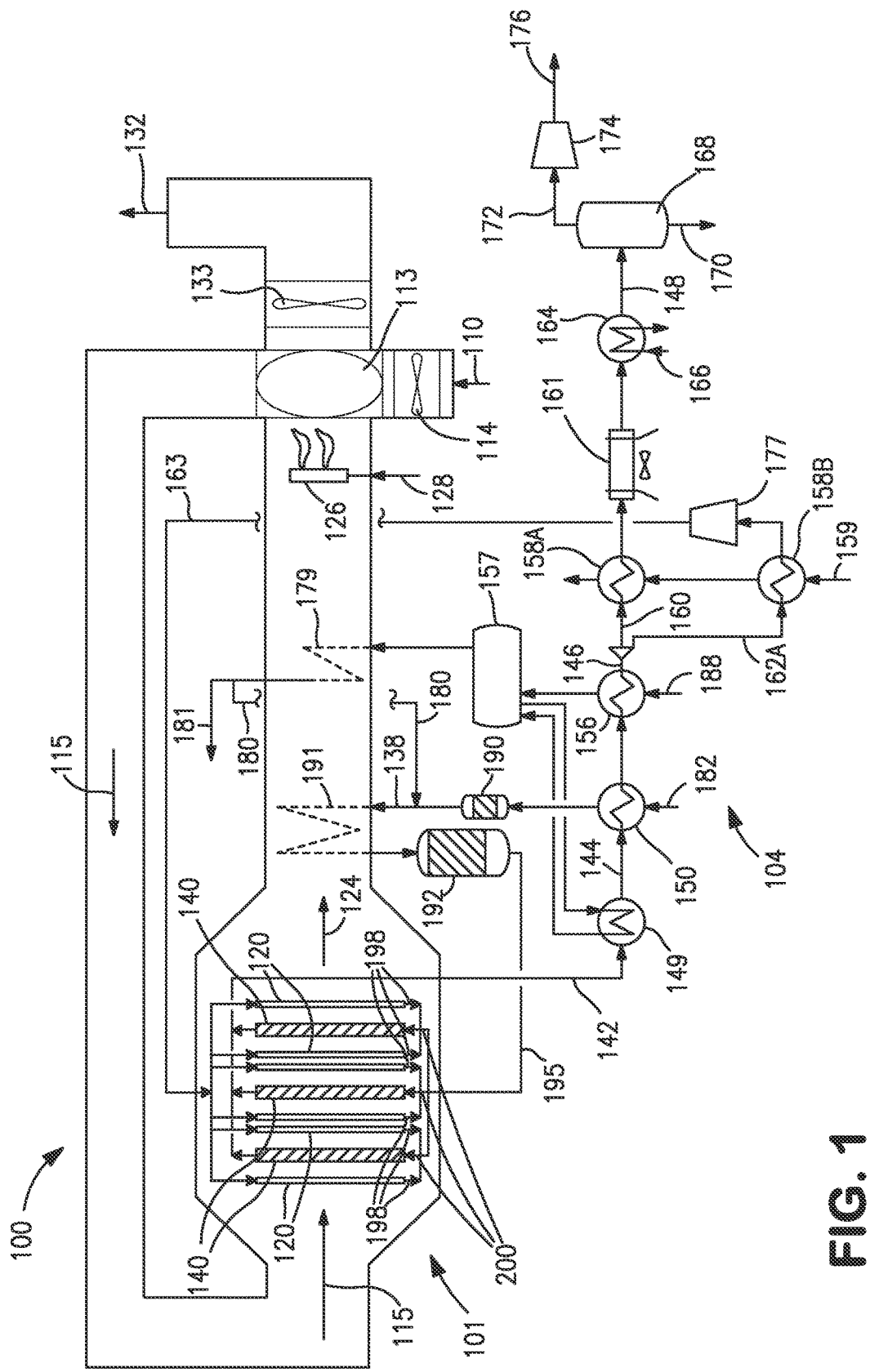
FIG. 1 is a schematic illustration of an embodiment of an oxygen transport membrane based reforming system in accordance with the present invention.

Turning now to FIG. 1, there is shown a schematic illustration of an embodiment of an oxygen transport membrane based reforming system 101 and assembly 100 in accordance with the present invention. As seen therein, an oxygen containing stream 110, such as air, is introduced to the system by means of a blower or fan 114 into a heat exchanger 113 for purposes of preheating the oxygen containing stream 110. Heat exchanger 113 is preferably a high efficiency, cyclic a continuously rotating ceramic regenerator disposed in operative association with the oxygen containing stream 110 and the heated retentate stream 124. The heated and oxygen depleted retentate stream 124 can optionally be introduced into a duct burner region containing duct burner 126 and used to support combustion of a supplemental fuel stream 128 to produce supplemental heat introduced into the continuously rotating ceramic regenerator 113 to preheat the oxygen containing stream 110. Alternatively, the duct burner may also be disposed directly in the duct leaving heat exchanger 113 to pre-heat the oxygen containing stream 110. Exhaust stream 132 from heat exchanger 113 is discharged.

The heated oxygen containing stream 115 is then directed via the intake duct to the oxygen transport membrane elements 120 incorporated into the oxygen transport membrane based reforming system 101. Each of the oxygen transport membrane elements 120 are preferably configured as a multilayered ceramic tube capable of conducting oxygen ions at an elevated operational temperature, wherein the retentate side of the oxygen transport membrane elements 120 is the exterior surface of the ceramic tubes exposed to the oxygen containing stream and the permeate side is the interior surface of the ceramic tubes. Although only six oxygen transport membrane elements 120 are illustrated in close proximity to three catalytic reforming tubes 140, as would occur to those skilled in the art, there could be many of such oxygen transport membrane elements and many catalytic reforming tubes in each oxygen transport membrane sub-system. Likewise, there would be multiple oxygen transport membrane sub-systems used in an industrial application of the oxygen transport membrane based reforming system 101.

A hydrogen containing stream is also introduced into the permeate side of the oxygen transport membrane elements 120 and is oxidized though reaction with the permeated oxygen to produce a reaction product stream 198 and heat. As described in more detail below, the hydrogen containing stream is preferably a recycled portion of the produced synthesis gas 163. As a result of the separation of the oxygen and the reaction (i.e. combustion) occurring at the permeate side of oxygen transport membrane elements 120, a heated and oxygen depleted retentate stream 124 is also formed.

The reaction of the hydrogen containing stream or recycled synthesis gas stream 163 at the permeate side of the oxygen transport membrane element 120 produces heat. Radiation of this heat together with the convective heat transfer provided by heated retentate stream 124 heats the catalytic reactor tubes 140 to supply the endothermic heating requirements of the steam methane reforming occurring in catalytic reactor tubes 140. As the heated retentate stream 124 exits the oxygen transport membrane based reforming system 101, it also heats a reformer feed stream 138 to a temperature between about 450° C. and 650° C. via indirect heat transfer using one or more coils 191 disposed in the retentate duct such that the oxygen depleted retentate stream 124 heats the feed streams passing through the coils 191.

The hydrocarbon containing feed stream 182 to be reformed is preferably natural gas. Depending on the supply pressure, the natural gas is compressed or let down to the desired pressure via a compressor or valve arrangement (not shown) and then preheated in heat exchanger 150 that serves as a feed preheater. Also, since the natural gas typically contains unacceptably high level of sulfur species, the natural gas feed stream 182 undergoes a sulfur removal process such as hydro-treating, via device 190, to reduce the sulfur species to $H_2S$, which is subsequently removed in a guard bed using material like ZnO and/or CuO. To facilitate the desulfurization, a small amount of hydrogen or hydrogen-rich gas (not shown) is added to stream 182 before heat exchanger 150. The hydro-treating step also saturates any alkenes present in the hydrocarbon containing feed stream. Further, since natural gas generally contains higher hydrocarbons that will break down at high temperatures to form unwanted carbon deposits that adversely impact the reforming process, the natural gas feed stream 182 is preferably pre-reformed in an adiabatic pre-reformer 192, which converts higher hydrocarbons to methane, hydrogen, carbon monoxide, and carbon dioxide. Pre-reformers are typically catalyst-based systems. Although not shown, this pre-reformed reformer feed stream 195 may be further heated via indirect heat exchange with heated retentate stream 124. Also contemplated, but not shown is an embodiment where the pre-reformer is a heated pre-reformer that is thermally coupled with oxygen transport membrane based reforming system.

In the illustrated embodiment, the above-described heated reaction product stream 198 is combined with the heated pre-reformed reformer feed stream 195 to produce a combined feed stream 200 that contains steam and hydrocarbons. This combined feed stream is introduced into the catalytic reactor tubes 140 where the combined feed stream 200 is subjected to steam methane reforming to produce a synthesis gas stream 142. The temperature of the combined feed stream 200 is between about 500° C. and 750° C., and more preferably between about 600° C. and 750° C. Steam 180 may also be added to the combined feed stream 200, the natural gas feed stream 182, or the preheated pre-reformed reformer feed stream 195, as required, to adjust the temperature of stream 200 as well as the steam to carbon ratio of stream 200 to between about 1.6 and 3.0, and more preferably to steam to carbon ratio between about 2.0 and 2.8. The steam is preferably superheated steam 180 between about 15 bar and 80 bar and between about 300° C. and 600° C. and heated by means of indirect heat exchange with the heated retentate stream 124 using steam coils 179 disposed in the retentate duct. The superheated steam 180 is preferably added to the hydrocarbon containing feed stream 182 upstream of the pre-reformer 192 to adjust the steam to carbon ratio and final temperature of the combined feed stream 200. Also, to optimize the economic performance of the oxygen transport membrane based reforming system in a methanol production process, the methane slip should be less than 4.5 percent by volume and preferably less than 2.5 percent by volume.

The synthesis gas stream 142 produced by the oxygen transport membrane based reforming system 101 generally contains hydrogen, carbon monoxide, unconverted methane, steam, carbon dioxide and other constituents. Heat exchange section 104 is designed to cool the produced synthesis gas stream 142 and recycle a portion of the synthesis gas stream 162A to form all or a part of the hydrogen containing stream 163. In this illustrated embodiment, the synthesis gas stream 142 is preferably cooled before recycling such stream using a synthesis gas recycle compressor 177 or other blower means. The heat exchange section 104 is also designed such that in cooling the synthesis gas stream 142, various feed streams are preheated and process steam is also generated.

The initial cooling of synthesis gas stream 142 is accomplished with steam generation in a process gas boiler (PG boiler) 149 coupled to steam drum 157 and designed to reduce the temperature of the cooled synthesis gas 144 to about 400° C. or less. As illustrated in FIG. 1, the initially cooled synthesis gas stream 144 is successively further cooled in a heat exchange network that includes hydrocarbon feed preheater 150, economizer 156, feed water heaters 158A and 158B, synthesis gas cooler 161 and water cooled heat exchanger 164. Specifically, the initially cooled synthesis gas stream 144 is directed to the feed preheater 150 to heat the natural gas feed stream 182 and then is directed to economizer 156 to heat boiler feed water 188. Boiler feed water stream 188 is preferably pumped using a feed water pump (not shown), heated in economizer 156 and sent to steam drum 157.

The cooled synthesis gas stream 146 is then divided into a first portion 160 and a second or recycled portion 162A. First portion 160 is further cooled in a series of steps including a feed water heater 158A, used to heat feed water stream 159, followed by a synthesis gas cooler 161 and a subsequent water cooled heat exchanger 164 cooled via a separate cooling water stream 166. The heated feed water 159 is directed to a de-aerator (not shown) that provides boiler feed water 188. The resulting fully cooled synthesis gas stream 148 is then introduced into a knock-out drum 168 from which a condensate stream 170 is drained to produce a fully cooled synthesis gas stream 172. The fully cooled synthesis gas stream 172 is optionally compressed in a synthesis gas compressor 174 to produce a synthesis gas product 176.

The second or recycle portion 162A of the initially cooled synthesis gas stream 144 is directed to a second feed water heater 158B, used to heat feed water stream 159, and this cooled recycle synthesis gas stream 163 is recirculated back to the permeate side of the oxygen transport membrane element 120 by means of a recycle compressor 177. Also note that any superheated steam not added or used in the natural gas feed 182 or recycle synthesis gas stream 163 is exported steam 181 that may be used for power generation.

When customized as a supplemental source of synthesis gas for a methanol production process, the oxygen transport membrane produced synthesis gas should have a module of between about 1.5 and 2.0. In addition, such produced synthesis gas stream ideally has a methane slip of less than about 4.5 percent by volume and more preferably, a methane slip of less than about 2.5 percent by volume.

Figure 2:
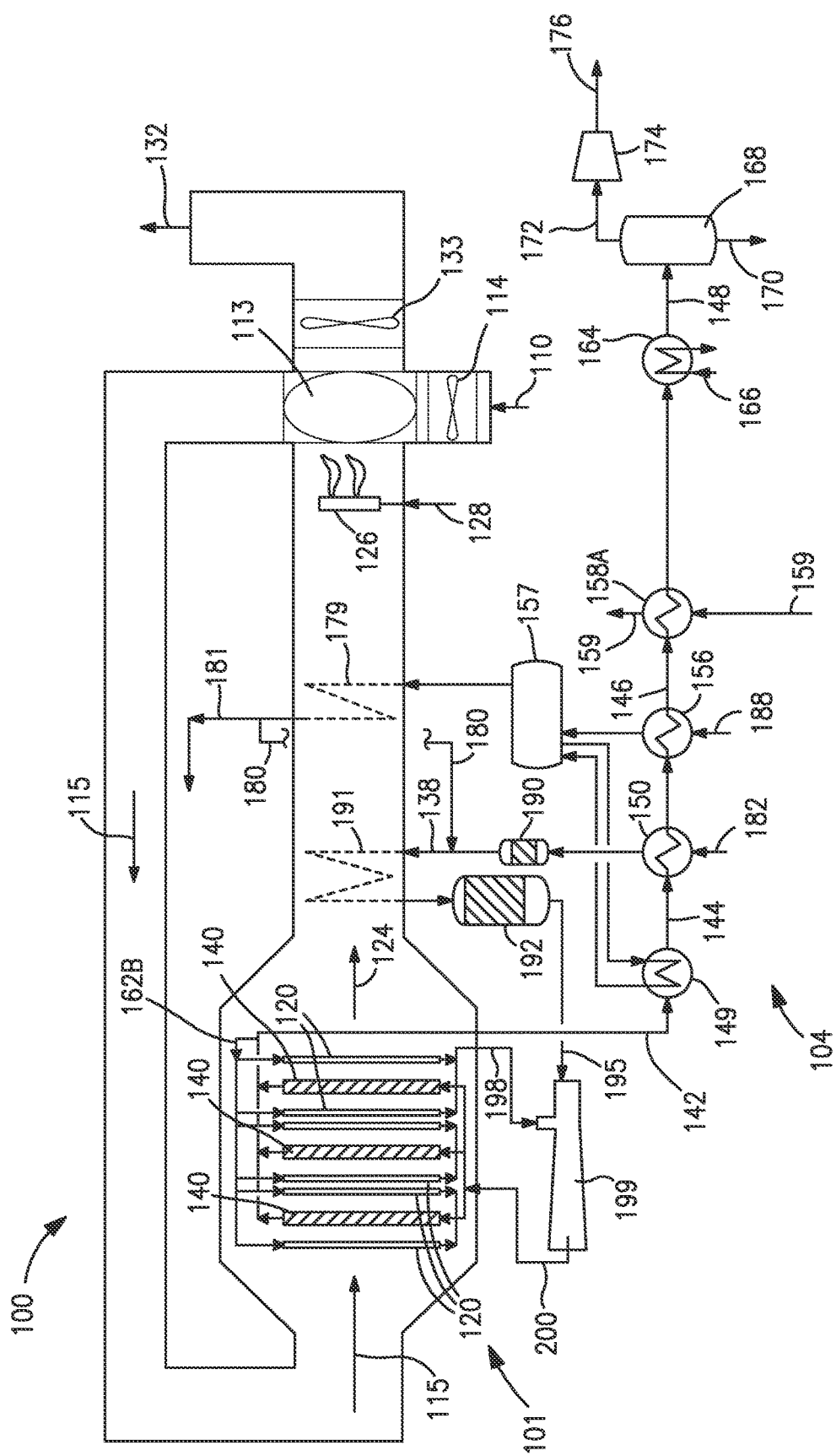
FIG. 2 is a schematic illustration of an alternate embodiment of an oxygen transport membrane based reforming system in accordance with the present invention.

Turning now to FIG. 2, there is shown a schematic illustration of an embodiment of an oxygen transport membrane based reforming system. In many regards, this embodiment is similar to the embodiment of FIG. 1 and, for sake of brevity, the description of the common aspects of the two embodiments will not be repeated here, rather, the following discussion shall focus on differences between in FIG. 1 and FIG. 2.

The primary difference between the embodiments in FIG. 1 and FIG. 2 is the use of a hot synthesis gas recycle 162B in FIG. 2 embodiment in lieu of the cold gas recycle 162A in the embodiment of FIG. 1. As a result, the heat exchange section 104 in FIG. 2 is designed to only cool the produced synthesis gas stream 142 and need not recycle a portion of the cold synthesis gas stream 162A. By using the hot synthesis gas recycle 162B, there is no need to use the synthesis gas recycle compressor 177 or the second feed water heater 158B, used to heat feed water stream 159 potentially further reducing the capital cost of the oxygen transport membrane based reforming system.

The hot synthesis gas recycle involves recycling a portion of the heated synthesis gas stream 142 exiting the catalyst containing reforming tubes or reactor 140 and directing the hot recycled synthesis gas 162B to the permeate side of the oxygen transport membrane elements 120 to react the portion of heated synthesis gas stream 162B with the oxygen permeate stream to generate the heated reaction product stream and radiant heat. The temperature of the hot synthesis recycled gas is preferably above 800° C. so as to avoid problems associated with metal dusting corrosion.

The hot synthesis gas stream 162B is driven or pulled to the permeate side of the oxygen transport membrane elements 120 by means of an ejector, eductor or venturi based device 199 operatively coupled to the permeate side of the oxygen transport membrane elements 120. By suctioning the streams at the permeate side of the oxygen transport membrane elements 120 into the ejector, eductor or venturi based device 199 with a motive fluid comprising the pre-reformed reformer feed stream 195, the reaction product stream 198 mixes with the pre-reformed reformer feed stream 195 to produce the combined feed stream 200, preferably having a steam to carbon ratio between about 1.6 and 3.0 and a temperature between about 500° C. and 750° C. Essentially, device 199 moves lower pressure reaction product 198 to higher pressure combined feed stream 200.

Figure 3:
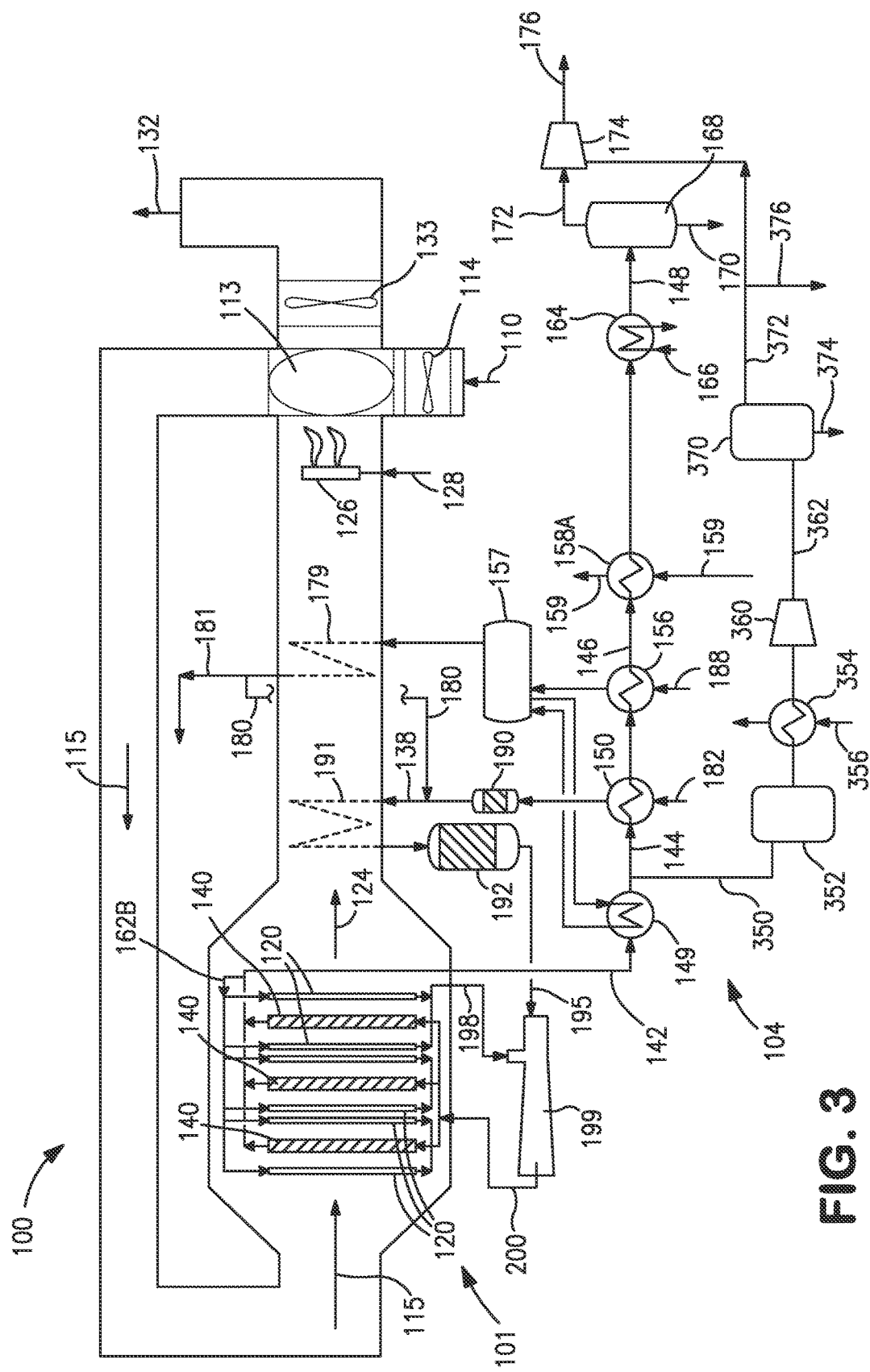
FIG. 3 is a schematic illustration of an alternate embodiment of an oxygen transport membrane based reforming system in accordance with the present invention for a methanol production facility, where the oxygen transport membrane based reforming system is the only or primary source of synthesis gas supply.

Turning now to FIG. 3, there is shown a schematic illustration of yet another alternate embodiment of an oxygen transport membrane based reforming system. In many regards, this illustrated embodiment is similar to the embodiments shown in FIG. 1 and FIG. 2. Thus, for sake of brevity; the description of the common aspects of the embodiments will not be repeated here. Rather, the following discussion shall focus on the differences present in the embodiment of FIG. 3. The primary difference between the embodiments in FIG. 2 and FIG. 3 is the addition of downstream processing of the initially cooled synthesis gas in the embodiment of FIG. 3. As seen therein, a portion of cooled synthesis gas 350 is diverted to a synthesis gas conditioning system. This diverted portion of cooled synthesis gas stream 350 is roughly between about 5% and 25% of synthesis gas stream 142.

The diverted portion of the cooled synthesis gas stream 350 is subjected to a water shift reaction 352 and subsequently cooled in heat exchanger 354 using cooling water or boiler feed water and then compressed in a synthesis gas compressor 360. The compressed gas feed stream 362 is directed to a hydrogen pressure swing adsorption (PSA) unit 370 which takes the compressed feed stream 362 and produces a higher purity hydrogen stream 372 at or near the feed pressure while the carbon oxides, methane and other impurities are rejected at lower pressure tail gas stream 374. Stream 374 may be recycled to use with the duct burners 126 while the higher pressure and higher purity hydrogen stream 372 is recombined with the non-diverted portion of the synthesis gas stream 172, preferably at some point mid-stage point within the synthesis gas compressor 174. By re-combining the higher purity hydrogen stream 372 with the non-diverted portion of the synthesis gas stream 172, one can adjust the module of the final synthesis gas product to about 2.0 to 2.2, the preferable range for methanol production or other synthesis gas characteristics such as hydrogen to carbon monoxide ratio, etc.

One of the likely disadvantages of the previously disclosed oxygen transport membrane based reforming systems and reactors is the potential for corrosion, and in particular metal dusting corrosion. Metal dusting is a severe form of corrosion that occurs when surfaces of certain metal and metal alloy components and piping are exposed to severe gas environments with a high carbon activity or content. The metal dusting corrosion is manifested by disintegration of bulk metals, such as iron, nickel and cobalt to metal powders. The typical metal dusting process results from a series of sequential steps, including (i) rapid uptake of carbon into the metallic phase leading to saturation of the alloy matrix with carbon; (ii) formation of metastable carbides; and (iii) decomposition of these carbides into a loose film of carbon and metallic particles, which acts as catalyst for further carbon deposition. The exact mechanism may vary depending on the type of metal being used. The temperatures normally associated with metal dusting are about 400° C. to 800° C. (i.e. about 760° F. to about 1500° F.). At temperatures generally below 400° C. the rate of reaction to form the metastable carbide species is too low to be significant, while at temperatures above 800° C. the carbon formation is minimal.

To avoid the metal dusting corrosion in the oxygen based transport membrane based reforming system and associated components and piping, the system should be designed to avoid contact of any synthesis gas with metal surfaces having temperatures between about 400° C. to 800° C. While it is possible to provide corrosion resistant coatings on all high temperature metal surfaces exposed to synthesis gas, such solution would be cost prohibitive. The alternative corrosion prevention technique employed in the present embodiments is to manage the temperatures of the synthesis gas so as to avoid contacting bare metal surfaces with synthesis gas in the deleterious temperature range where metal dusting corrosion occurs.

As will be described in more detail below, the present embodiments of the inventions achieve this temperature control of the metal surfaces exposed to the synthesis gas in several ways. In particular for the embodiments in FIGS. 2 and 3, the oxygen based transport membrane based reforming systems preferably recycles the synthesis gas in a high temperature state, generally above 800° C. where the nonrecycled portion of the synthesis gas is cooled in the PG boiler until the synthesis gas is cooled below 400° C. The metal surfaces of the synthesis gas piping exiting the reactor are either maintained at a temperature above 800° C. or have refractory surfaces. The metal surfaces in the PG boiler and other elements of the heat recovery system that are exposed to the synthesis gas are generally maintained at temperatures below about 400° C.

In the embodiment of FIG. 1 where cooled synthesis gas is recycled back to the oxygen based transport membrane based reactor, the cooled recycled synthesis gas stream is maintained at temperatures below about 400° C. The recycled synthesis gas stream 163 can be preheated against steam or any other stream as long as the wall temperature is less than about 400° C. For this reason, the addition of superheated steam to the recycled synthesis gas stream should be avoided unless the addition of superheated steam maintains the temperatures below about 400° C.

Figure 4:
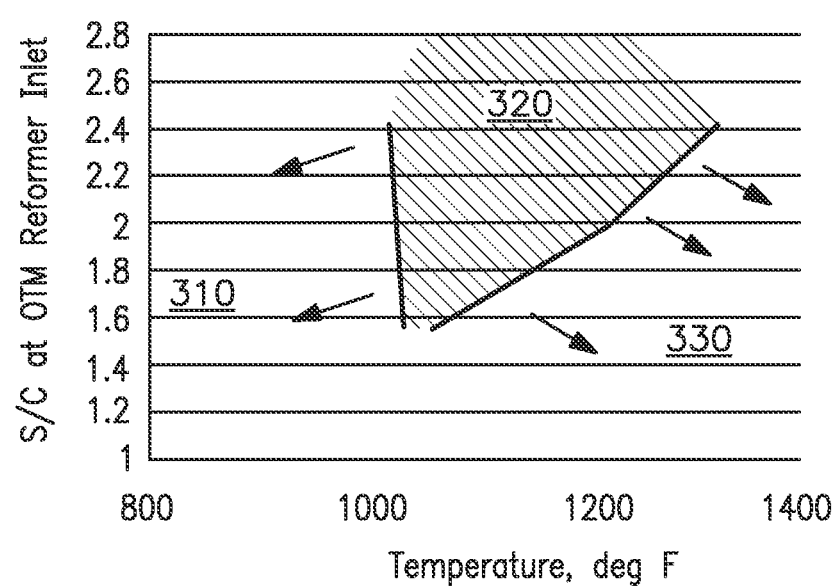
FIG. 4 is a graph of the temperature of a feed stream versus steam to carbon ratio of the feed stream and depicting various performance regimes of an oxygen transport membrane based reforming system.

Turning now to FIG. 4, region 310 on the feed temperature versus feed steam to carbon ratio graph generally corresponds to a combined feed stream feed at a temperature near or below about 500° C. and having a steam to carbon ratio of between 1.5 and 2.4. Because the present combined feed stream contains carbon monoxide produced in the pre-reformer, a combined feed stream having characteristics of region 310, may undergo unwanted Boudouard reactions thereby depositing excessive amounts of soot on the oxygen transport membrane based reforming system as well as associated components and piping. The Boudouard reaction is a redox reaction of a mixture of carbon monoxide and carbon dioxide at a given temperature and involves the disproportionation of carbon monoxide into carbon dioxide and carbon (i.e. soot).

On the other hand, region 330 generally corresponds to a region of high temperature and low steam to carbon ratios where the combined feed stream is subject to carbon lay down in the reforming catalysts. Region 330 is generally depicted as the region to the right of the curve or plot line on the feed temperature versus steam to carbon ratio defined by two points, namely a feed temperature of near 1500° C. with a steam to carbon ratio of about 1.5 and a feed temperature of about 700° C. with a steam to carbon ratio of about 2.4 (See FIG. 4).

It has been found that conditioning the combined feed stream to a particular temperature range and steam to carbon ratio which avoids regions 310 and 330 translates into an optimum operating regime with noticeably less reliability problems in the oxygen transport membrane based reforming system due to carbon formation. This window of preferred operating characteristics for the combined feed stream is depicted generally as region 320 in FIG. 4.

While the present invention has been characterized in various ways and described in relation to preferred embodiments, as will occur to those skilled in the art, numerous, additions, changes and modifications thereto can be made without departing from the spirit and scope of the present invention as set forth in the appended claims.

What is claimed is:

1. A method for producing synthesis gas in an oxygen transport membrane based reforming system, wherein said system comprises two distinct reactors:

at least one catalyst containing reforming reactor comprising a plurality of catalytic reforming tubes, wherein said reforming reactor is configured to produce a synthesis gas stream by reacting a combined feed stream in the presence of the catalyst and heat; and a reactively driven oxygen transport membrane reactor proximate to said at least one catalyst containing reforming reactor, the reactively driven oxygen transport membrane reactor comprising a plurality of oxygen transport membrane elements configured to separate oxygen from an oxygen containing feed stream and produce an oxygen permeate at a permeate side of the oxygen transport membrane elements and an oxygen depleted retentate stream at a retentate side of the oxygen transport membrane elements, the method comprising the steps of:

separating an oxygen containing stream into an oxygen permeate and an oxygen depleted retentate stream using a plurality of oxygen transport membrane elements disposed in the oxygen transport membrane based reforming system;

reacting a hydrogen containing stream contacting a permeate side of the oxygen transport membrane elements with the oxygen permeate to generate a reaction product stream and heat;

pre-heating a hydrocarbon containing feed stream and combining the pre-heated hydrocarbon containing feed stream with a portion of the reaction product stream and steam to produce a combined feed stream having a temperature between about 500° C. and 750° C.;

reforming the combined feed steam in the at least one catalyst containing reforming reactor in the presence of the catalyst and heat, wherein said heat is generated said oxygen transport membrane reactor by the reaction of the hydrogen containing stream and permeated oxygen, to produce a synthesis gas stream, the at least one catalyst based reforming reactor disposed proximate the oxygen transport membrane elements;

cooling the synthesis gas stream exiting the oxygen transport membrane based reforming system in a heat exchange network fluidly coupled to the reforming reactor and the oxygen transport membrane reactor, wherein said network comprises one or more coils disposed in an oxygen depleted retentate stream duct, wherein steam is superheated via indirect heat exchange between the oxygen depleted retentate stream as the steam is directed through the one or more coils disposed in the oxygen depleted retentate stream duct, wherein said heat exchange network is configured to: (i) cool the synthesis gas stream exiting the at least one catalyst containing reforming reactor to a temperature of less than about 400° C.; (ii) produce steam, and (iii) optionally pre-heat a hydrocarbon containing feed stream; and feeding a portion of the cooled synthesis gas stream to the permeate side of the plurality of oxygen transport membrane elements to form all or a portion of the hydrogen containing stream;

wherein the oxygen transport membrane based reforming system and associated synthesis production process equipment are substantially free of carbon formation and metal dusting corrosion.

2. The method of claim 1 further comprising the step of superheating the steam by heating the steam via indirect heat exchange with the heated retentate stream and feeding a portion of the superheated steam to the hydrocarbon containing feed stream to adjust the steam to carbon ratio and temperature of the combined feed stream.

3. The method of claim 2 wherein the superheated steam is between about 15 bar to 80 bar and between about 300° C. and 600° C.

4. The method of claim 1 wherein the step of pre-heating the hydrocarbon feed stream further comprises pre-heating the hydrocarbon containing feed stream via indirect heat exchange with the synthesis gas stream or via indirect heat exchange with the oxygen depleted retentate stream or both.

5. The method of claim 1 further wherein the step of combining the pre-heated hydrocarbon containing feed stream with a portion of the reaction product stream and steam to produce the combined feed stream further comprises mixing the hydrocarbon feed stream with superheated steam and heating the mixed stream via indirect heat exchange with the oxygen depleted retentate stream.

6. The method of claim 1 wherein the step of feeding a portion of the cooled synthesis gas stream to the permeate side of the plurality of oxygen transport membrane elements further comprises:
    compressing the portion of the cooled synthesis gas stream while maintaining the temperature of the cooled, compressed portion of the synthesis gas stream at a temperature less than about 400° C.; and
    directing the cooled, compressed portion of the synthesis gas stream to the permeate side of the oxygen transport membrane elements to react with the oxygen permeate to generate the reaction product stream and heat.

7. The method of claim 1 further comprising the steps of:
    Feeding the oxygen depleted retentate stream to a duct burner where it reacts with a source of supplemental fuel to produce a heated exhaust stream; and
    heating the oxygen containing stream via indirect heat exchange with the heated exhaust stream using a continuously rotating ceramic regenerator disposed in operative association with the oxygen containing stream and the heated retentate stream.

8. The method of claim 1 further comprising the steps of further cooling the synthesis gas stream with one or more of the following streams: a boiler feed water stream in an economizer to produce heated boiler feedwater; a feed water stream in a feed water heater to heat the feed water; or a cooling water stream in a cooling water heat exchanger.

9. An oxygen transport membrane based reforming system for producing synthesis gas which comprises two distinct reactors, said system comprising:
    a reactor housing;
    at least one catalyst containing reforming reactor comprising a plurality of catalytic reforming tubes disposed in the reactor housing and configured to produce a synthesis gas stream by reacting a combined feed stream in the presence of the catalyst and heat; and
    a reactively driven oxygen transport membrane reactor disposed in the reactor housing proximate the at least one catalyst containing reforming reactor, the reactively driven oxygen transport membrane reactor comprising a plurality of oxygen transport membrane elements configured to separate oxygen from an oxygen containing feed stream and produce an oxygen permeate at a permeate side of the oxygen transport membrane elements and an oxygen depleted retentate stream at a retentate side of the oxygen transport membrane elements;
    a hydrogen containing stream in contact with the permeate side of the plurality of oxygen transport membrane elements, wherein the permeated oxygen reacts with the hydrogen containing stream to reactively drive the separation of oxygen from the oxygen containing feed stream and to generate a reaction product stream and heat that is transferred to the oxygen depleted retentate stream and to at least one catalyst containing reforming reactor; and
    a heat exchange network fluidly coupled to the reforming reactor and the oxygen transport membrane reactor, the heat exchange network comprising one or more coils disposed in an oxygen depleted retentate stream duct, wherein steam is superheated via indirect heat exchange between the oxygen depleted retentate stream as the steam is directed through the one or more coils disposed in the oxygen depleted retentate stream duct, said heat exchange network configured to: (i) cool the synthesis gas stream exiting the at least one catalyst containing reforming reactor to a temperature of less than about 400° C.; (ii) produce steam, and (iii) optionally pre-heat a hydrocarbon containing feed stream;
        wherein the pre-heated hydrocarbon feed and steam are mixed with the reaction product stream upstream of the at least one catalyst containing reforming reactor to produce the combined feed stream having a temperature between 500° C. and 750° C.; and
        wherein the oxygen transport membrane based reforming system and associated synthesis production process equipment are substantially free of carbon formation and metal dusting corrosion.

10. The system of claim 9 wherein the heat exchange network further comprises:
    a first heat exchanger configured to cool the synthesis gas stream via indirect heat exchange with a process gas boiler feed stream and wherein the steam is produce from the indirect heat exchange between the synthesis gas stream and the process gas boiler feed water stream; and
    optionally, a second heat exchanger configured to pre-heat the hydrocarbon containing feed stream via indirect heat exchange with the cooled synthesis gas stream.

11. The system of claim 9 wherein the superheated steam is between about 15 bar to 80 bar and between about 300° C. and 600° C.

12. The system of claim 9 wherein the hydrocarbon containing feed stream is further pre-heated via indirect heat exchange with the oxygen depleted retentate stream as the hydrocarbon containing feed stream is directed through the one or more coils disposed in the oxygen depleted retentate stream duct or a combined stream of the hydrocarbon containing feed stream and superheated steam is directed through the one or more coils disposed in the oxygen depleted retentate stream duct.

13. The system of claim 9 wherein the combined feed stream has a steam to carbon ratio between about 1.6 and 3.0 and a temperature between about 500° C. and 750° C.

14. The system of claim 9 further comprising a synthesis gas recycle circuit between the heat exchange network and the oxygen transport membrane reactor to recirculate a portion of the cooled synthesis gas to the permeate side of the oxygen transport membrane elements as all or a portion of the hydrogen containing stream.

15. The system of claim 14 wherein the synthesis gas recycle circuit further comprises a compressor configured to compress the cooled synthesis gas stream while maintaining the temperature of the cooled, compressed portion of the synthesis gas stream at a temperature less than about 400° C.

16. The system of claim 9 further comprising:
    a burner disposed in the oxygen depleted retentate stream duct and configured to produce a heated exhaust stream using the oxygen depleted retentate stream and a source of supplemental fuel; and a continuously rotating ceramic regenerator configured to transfer heat from the heated exhaust stream to the oxygen containing feed stream.

17. The system of claim 9 further comprising a burner disposed in an air intake duct and configured to produce a heated oxygen containing stream using the oxygen containing stream and a source of supplemental fuel.

* * * * *